Nov. 19, 1968 W. T. BUTLER 3,411,586
APPARATUS FOR COMBINING THE FLOW OF TWO FLUIDS
Filed Aug. 26, 1966 5 Sheets-Sheet 1

FIGURE I

INVENTOR.
WILBUR T. BUTLER
BY
ATTORNEY

Nov. 19, 1968    W. T. BUTLER    3,411,586
APPARATUS FOR COMBINING THE FLOW OF TWO FLUIDS
Filed Aug. 26, 1966    5 Sheets-Sheet 2

INVENTOR.
WILBUR T. BUTLER
BY *David P. Cullen*
ATTORNEY

INVENTOR.
WILBUR T. BUTLER
BY
ATTORNEY

Nov. 19, 1968  W. T. BUTLER  3,411,586
APPARATUS FOR COMBINING THE FLOW OF TWO FLUIDS
Filed Aug. 26, 1966  5 Sheets-Sheet 4

INVENTOR.
WILBUR T. BUTLER
BY
ATTORNEY

Nov. 19, 1968 W. T. BUTLER 3,411,586
APPARATUS FOR COMBINING THE FLOW OF TWO FLUIDS
Filed Aug. 26, 1966 5 Sheets-Sheet 5

INVENTOR.
WILBUR T. BUTLER
BY
ATTORNEY

United States Patent Office 3,411,586
Patented Nov. 19, 1968

3,411,586
APPARATUS FOR COMBINING THE FLOW
OF TWO FLUIDS
Wilbur T. Butler, Borger, Tex., assignor to Continental Oil
Company, Ponca City, Okla., a corporation of Delaware
Filed Aug. 26, 1966, Ser. No. 575,932
10 Claims. (Cl. 166—75)

The present invention relates to apparatus for combining the flow of two fluids and, in a primary aspect thereof, relates to apparatus for chemically treating the bore of a well.

In the routine operation of a producing oil well, various problems are encountered which may, to some extent, be solved, or at least alleviated by treating the oil well with certain chemical substances. For instance, in many places where crude oil is produced it is accompanied by substantial quantities of hydrogen sulfide which causes corrosion problems; and it has been found that these corrosion problems can be alleviated by adding to the well bore certain chemicals which are well known in the art. In other situations, paraffin accumulates, presenting problems due to the build-up of this material on the well hardware with the resulting necessity for its removal. In these instances other well known materials may be injected into the oil well to prevent paraffin accumulation. A similar problem arises from the build-up of scale—such as, barium sulfate scale—which is extremely difficult to remove from the well hardware and which must be prevented by the addition to the well of still other chemical substances.

A number of types of equipment have been designed for furnishing chemicals to the bore of a well for these and other purposes. However, until the present time, equipment for this purpose has been subject to one or more shortcomings which reduce or, in some cases eliminate, its practical effectiveness. Sometimes, for instance, equipment designed for well treating purposes is so complex that its cost outweighs the financial advantages of its utilization. In other instances, such equipment has been found to be troublesome, either due to the failure of the equipment components themselves or due to build-up of undesirable material within the equipment. In still other instances, it has been necessary for the pumper to closely monitor the operation of the equipment, which thereby decreases its economic advantage. For whatever the cause, until the present invention, a chemical injector for a well which is rugged in design, simple to construct and relatively trouble free in operation has remained an elusive desideratum.

It is, therefore, an object of the present invention to provide apparatus for combining the flow of two fluids.

Another object of the present invention is to provide apparatus for furnishing controlled amounts of treating chemicals to an oil well.

A further object of the present invention is to provide apparatus for periodically returning a treated stream of produced fluids into the annulus of a well.

An additional object of the present invention is to provide apparatus for treating oil wells which is operated by existing oil well structure.

Yet another object of the present invention is to provide apparatus for treating oil wells which can be easily adjusted to alter the amount of material furnished to the oil well.

Still another object of the present invention is to provide apparatus for interrupting the flow of produced fluids from an oil well and treating a portion of that fluid prior to its return to the well.

Another object of the present invention is to provide apparatus for treating an oil well which is relatively inexpensive to fabricate, simple in design and rugged in construction.

These and other objects may be achieved from apparatus embodying the present invention, which, in one form, may include a first fluid conduit with a valve assembly located therein. A positive displacement pump assembly may also be provided in communication with a source of treating fluid which is to be combined with the fluid in the first fluid conduit. Connecting with the first fluid conduit at a point downstream from the valve assembly is a second flow line which leads to the outlet on the positive displacement pump whereby fluid is moved by the pump into the first fluid conduit. Power means may also be provided for activating the valve assembly and the positive displacement pump, and such power means may include a power arm which is carried by and moved relative to a portion of the power means. Control means may also be provided for moving the power arm into and out of a position to engage the valve assembly and the pump assembly.

A more complete understanding of the present invention may be obtained from a careful perusal of the following written description in conjunction with an examination of the accompanying drawings wherein.

*General environmental structure*

Figure 1:
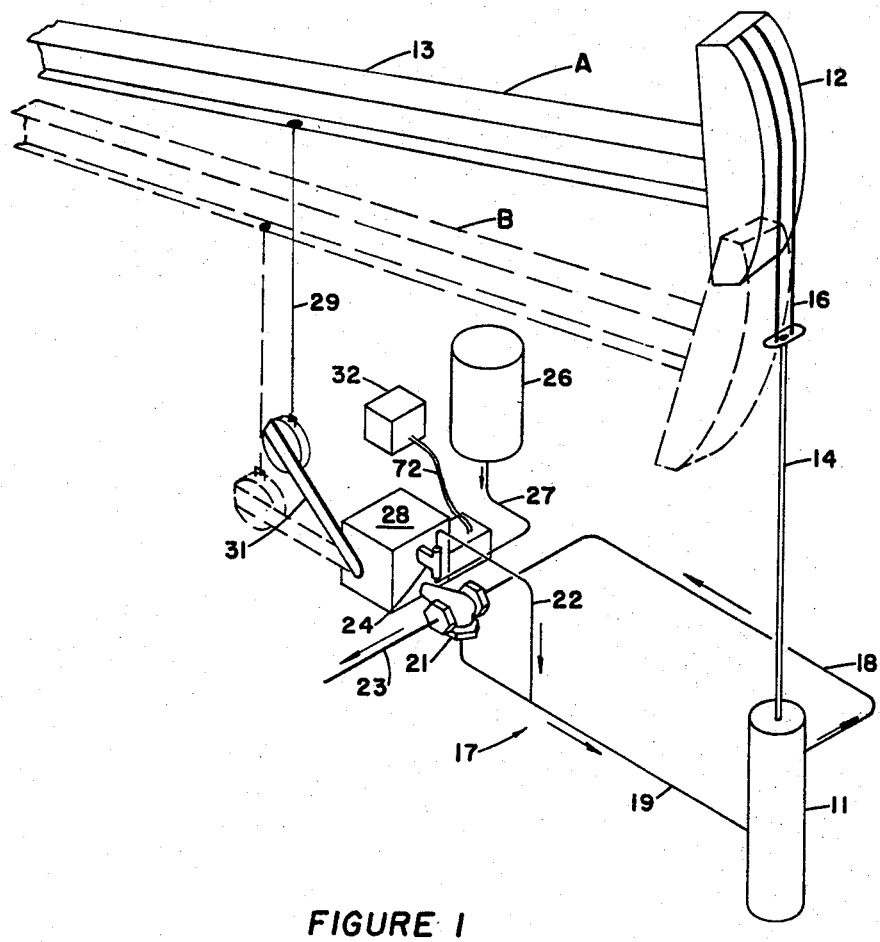
FIGURE 1 is a schematic isometric view of apparatus embodying one form of the present invention shown in its environment at a wellhead.

Turning now to the drawings and in particular to FIGURE 1, there is shown schematically a portion of a wellhead 11 which is mechanically connected to a horse head 12 and a rocking arm 13 by means of the usual polish rod 14 and harness assembly 16. Rocking arm 13, with its associated hardware, is oscillated from the full line position indicated by the letter "A" to the lower dotted line position indicated by the letter "B" by means not shown of a type which will be well-known to those skilled in the art.

A fluid flow assembly, indicated generally by the numeral 17, communicates with the interior of wellhead 11 by means of an outlet branch 18 through which produced fluids are moved from the tubing and by means of a return branch 19 which empties into the annular space surrounding the tubing. Both branches communicate with the interior of a two-position, three-way valve assembly indicated generally by the numreal 21. The fluid flow assembly 17 also includes a market or storage branch 23, which likewise communicates with the interior of valve 21, and a treatment line 22 through which chemical treating materials are furnished to return branch 19. At the upstream end of treatment line 22 is a positive displacement pump assembly 24 which operates to move chemicals suitable for treating an oil well from a storage container 26 through an inlet line 27, out treatment line 22 and into return branch 19. From return branch 19 these materials are introduced into the annulus of the wellbore surrounding the tubing string (not shown) and thence to the formation being produced and to the downhole well hardware.

Pump assembly 24 and valve assembly 21 are activated by structure embodying the present invention which is located within a housing 28 and which receives its energy from rocking arm 13 by means of a cable 29 secured to a weighted arm assembly 31. A timing means, indicated generally at 32—such as, a time clock or other similar structure—controls the activation of the apparatus within housing 28 so that it may be made to operate at such times and for such periods as is considered desirable.

*General operation of the system*

By way of example, the apparatus shown in FIGURE 1 may operate in the following general manner. Initially, a desired chemical treatment composition is placed within container 26 and timing means 32 is positioned so that the apparatus within housing 28 is in an inoperative position. Under these conditions, fluids produced from wellhead 11 flow outwardly therefrom through outlets branch 18 and valve 21 into storage branch 23 from which they are removed to storage or market. During this portion of the operation of the structure, arm 31 is continuously oscillated by cable 29; however, due to the setting of timing means 32, this oscillation has no effect on either valve assembly 21 or pump assembly 24.

On the expiration of a set interval, timing means 32 activates the mechanism within housing 28, whereupon valve assembly 21 is moved to return all of the fluid flowing through outlet branch 18 into return branch 19 and thence into the annulus surrounding the tubing string in the well. At the same time, pump assembly 24 is activated to pump chemical from storage container 26 through treatment line 22 into return branch 19 where it is mixed with the fluids being produced from the well. As these fluids flow downwardly in the well, they contact the various portions of the hardware within the well as well as the face of the producing formation and contact all of the sensitive portions of the well system.

After a predetermined interval, timing means 32 again deactivates the structural elements within housing 28 which in turn deactivate pump assembly 24 and re-positions valve assembly 21 to allow flow of produced fluids outwardly through storage branch 23.

*Specific structural details*

Figure 2:
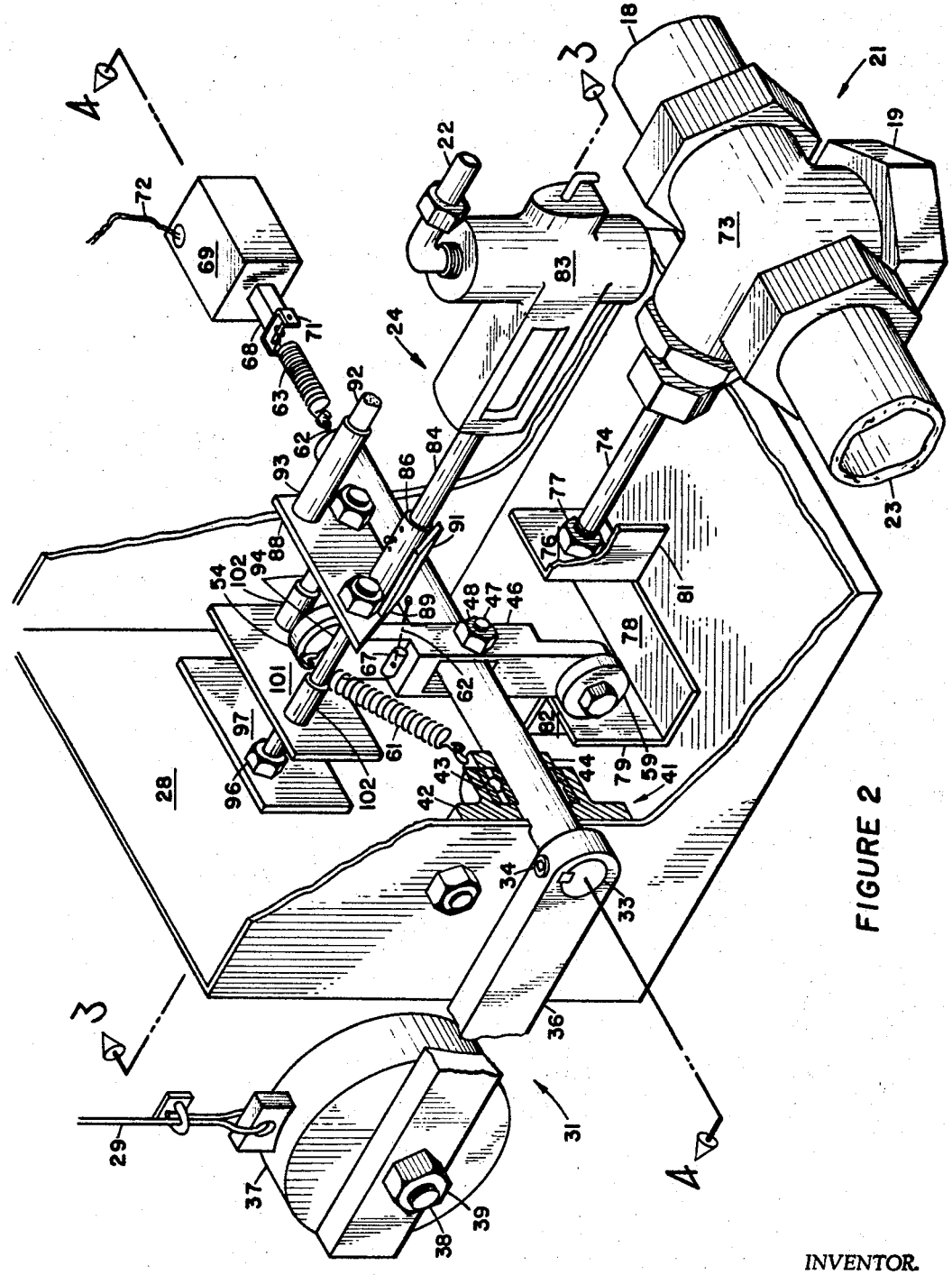
FIGURE 2 is an enlarged isometric view, shown partially in section, of the portions of the structure shown in FIGURE 1 which embody the present invention.
Figure 3:
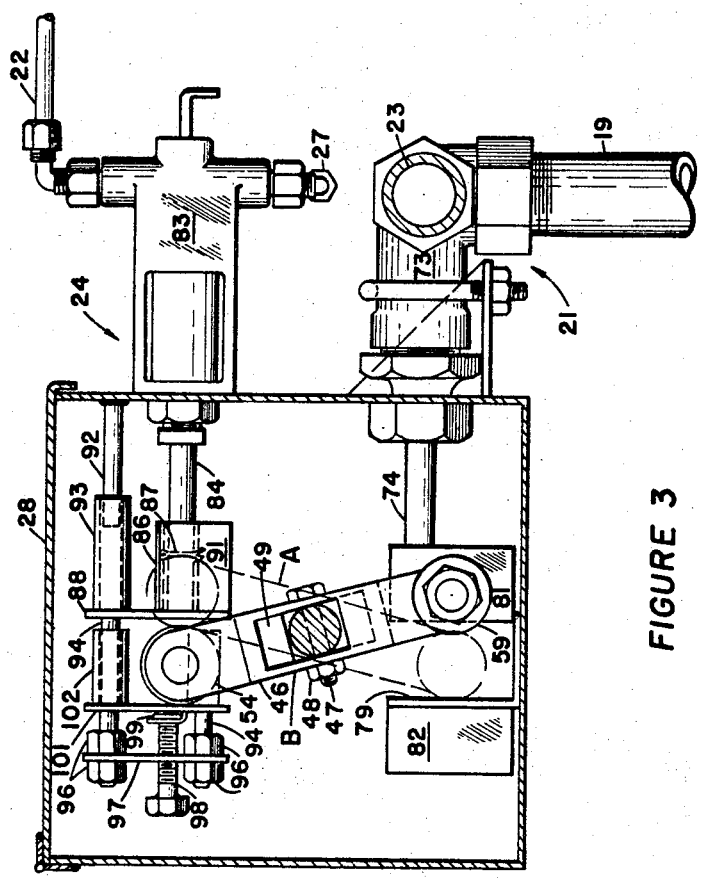
FIGURE 3 is a cross sectional view in reduced scale taken along line 3—3 of FIGURE 2 with a portion of the structure being eliminated for clarity and showing two alternative positions of a power arm which operates a valve assembly and a pump assembly.
Figure 4:
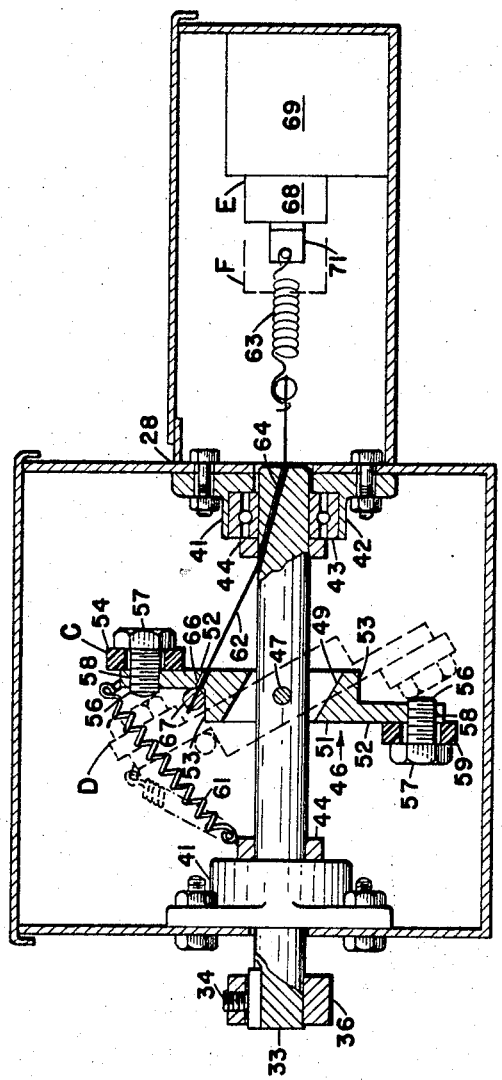
FIGURE 4 is a cross sectional view in reduced scale taken along line 4—4 of FIGURE 2 showing two alternative positions of a power arm and the control apparatus therefor.

The description of the present invention, up to the present time, has been couched in general terms; however, critical features of this invention reside in the structure carried within housing 28, one form of which is shown in more detail in FIGURES 2 through 4. In the isometric view presented by FIGURE 2, portions of housing 28 have been removed for clarity while other minor portions of the structure shown therein are shown in section, likewise for clarity. Thus, it may be seen that weighted arm assembly 31 is secured to a power shaft 33 by suitable means: such as, a set screw 34. Moreover, this assembly comprises a relatively long arm 36 at the end of which is maintained a suitable weight 37 which functions to return the arm to a lower position as the rocking arm moves from position A to position B as shown in FIGURE 1. Means are provided for securing weight 37 to arm 36 and in the embodiment shown such means consist of a threaded bolt 38 which is anchored to weight 37 and which cooperates with a nut 39 located in abutting engagement with arm 36.

Power shaft 33 is journaled within housing 28 by a pair of opposed bearing members 41, only one of which is shown in FIGURE 2. These bearing members include a stationary housing 42 in which is maintained a roller bearing assembly 43. A collar 44 is held on shaft 33 adjacent bearing assembly 43 by a suitable set screw (not shown) and functions to prevent horizontal motion of shaft 33 within housing 28.

A power arm 46 is pivotally mounted on shaft 33 by means of a bolt 47 and cooperating nuts 48, only one of which is shown in the drawings. Bolt 47 passes through power arm 46 in a direction which is generally normal to an aperture 49 (FIGURE 4) formed in the central portion of arm 46 through which power shaft 33 passes. It will be noted that the upper and lower faces of aperture 49 are at an angle with respect to the generally vertical faces of power arm 46 in order to allow the power arm to pivot from the full line position indicated as position C in FIGURE 4 to the dotted line indicated as position D.

Power arm 46 is formed with a central thickened body portion 51 in which aperture 49 is formed and from which extends, on opposite sides thereof, a pair of bearing carriers 52. These bearing carriers are of reduced thickness whereby a shoulder 53 is formed at the junction of bearing carrier 52 with body portion 51. An upper bearing 54 is maintained on the upper bearing carrier by suitable mounting means: such as, a threaded member 56 having an enlarged head 57 formed on one end thereof. At its opposite end, threaded member 56 fits within a threaded aperture 58 formed in upper bearing carrier 52. A lower bearing 59 is secured to lower bearing carrier 52 by means identical to the means by which upper bearing 54 is secured to the upper bearing carrier. In view of the identical function and structure of these securing means, such means have been assigned identical reference numerals.

A tension spring 61 is anchored at one end to the upper surface of upper bearing carrier 52 while its opposite end is secured to the righthand collar 44 as viewed in FIGURES 2 and 4.

Acting on power arm 46, in a direction opposite to the action of spring 61, is a cable 62 which is secured at one end to a tension spring 63. Extending from tension spring 63, the cable passes through an aperture 64 formed in, and at an angle with respect to, the longitudinal axis of power shaft 33. An aligned aperture 66 is formed in power arm 46 adjacent upper shoulder 53 to receive another portion of cable 62 as shown in FIGURE 4. Immediately adjacent aperture 66 and lying on upper shoulder 53 is an anchor 67 which secures one end of cable 62 against motion relative to power arm 46.

The end of spring 63 away from cable 62 is secured to an armature 68 of a solenoid 69 by means of a stirrup arrangement 71. In its normal position, indicated in dotted lines by the letter F in FIGURE 4, armature 68 projects outwardly from the body of solenoid 69. Upon activation of solenoid 69, the armature is drawn inwardly into position E, as shown in solid lines in FIGURE 4, to pull cable 62 to the right to pivot power arm 46 into position C. Activation of solenoid 69 occurs as a result of an incoming signal from timing means 32 through a pair of conductors 72.

Power arm 46 is provided to transmit the oscillatory motion of power shaft 33 to pump assembly 24 and valve assembly 21. Examination of FIGURES 2 and 3 will be helpful in understanding the structure which makes such power transmittal possible. More particularly, turning first to the valve assembly structure, it may be seen in FIGURE 2 that this assembly includes a valve housing 73, the interior of which communicates with storage branch 23, outlet branch 18 and return branch 19. The interior elements of valve assembly 21 are not shown in the drawing and comprise structure commonly available on the market which is capable of placing outlet branch 18 into alternate communication with storage branch 23 and return branch 19. The internal elements of the valve assembly are activated by means of a push rod 74 on one end of which is secured a pair of offset power arm engaging means. In the embodiment shown, these power arm engaging means comprise a vertical plate 76 which is threaded to the end of push rod 74 and locked thereon by means of a lock nut 77. The other power arm engaging means includes a vertical element 79 which is joined to plate 76 by means of horizontal connecting web 78. Element 79 is offset to the left, as viewed in FIGURE 2, from plate 76 so that it will not be in the path of lower bearing 59 when the power arm is in the dotted line position D as shown in FIGURE 4. A deflector 81 is carried by and normal to plate 76 while a similar deflector 82 is mounted normal to element 79.

Pump assembly 24, which is also activated by power arm 46, comprises a positive displacement pump 83 of standard design which is actuated by means of a push rod 84. Secured to the outer end of push rod 84 by means of a sleeve 86 and cotter pin 87 are power arm engaging means which include a power transmitting plate 101 and a force plate 88. Plate 88 is acted upon by power arm 46 to move push rod 84 inwardly toward pump 83 and thereby displace a quantity of fluid outwardly from the pump through treatment line 22. Force plate 88, as shown in FIGURE 2, is cut away at the lower lefthand corner thereof, as indicated by the numeral 89, in order to allow motion of power arm 46 past plate 88 when the power arm moves to position D, as shown in FIGURE 4. A deflector plate 91 is mounted abutting the angled end of plate 88 and extends outwardly therefrom past sleeve 86 for a purpose to be hereinafter disclosed. Pivotal motion of force plate 88 is prevented by means of a guide pin 92 which is secured to an inside portion of housing 28, as shown in FIGURE 3. A guide sleeve 93, carried by plate 88, slidingly receives pin 92 and operates to prevent rotational motion of the plate around push rod 84.

At the rear of plate 88 are positioned two parallel carrier rods 94. An adjustment plate 97 is secured to the ends of carrier rods 94 by means of nuts 96. A threaded member 98 is threaded into an aperture in adjustment member 97 and cooperates with a clevis 99 which is carried by power transmitting plate 101. Plate 101 is, in turn, slidingly secured on carrier rods 94 by means of sleeves 102 which are secured to plate 101 and slide over the carrier rods.

With the structure described immediately above, it is possible to adjust the distance between force plate 88 and power transmitting plate 101 whereby the stroke of pump 83 may be increased by decreasing the distance between the two plates and decreased by increasing the distance. This adjustment is accomplished by rotating threaded member 98 within the aperture formed in adjustment member 97 to move clevis 99 together with plate 101 toward and away from plate 88.

*Operation*

When the above-described apparatus is in its inactive condition, push rod 74 has been moved to its furtherest position toward valve housing 73 and push rod 84 is in its furtherest extended position from pump 83. In addition, power arm 46 is tilted with respect to power shaft 33, as indicated in dotted line position D shown in FIGURE 4. Under these circumstances, oscillation of power shaft 33 results in the extreme positions of power arm 46, indicated by A and B in FIGURE 3 which corresponds to positions A and B, respectively, of rocking arm 13 shown in FIGURE 1. When the power arm is in position A, upper bearing 54 has moved past plate 88, due to the presence of cutaway portion 89, and is in a position adjacent deflector plate 91. At the same time, lower bearing 59 has moved backward away from push rod 74 into a position adjacent deflector 82 which is carried by element 79. In this regard, it should be noted that in FIGURE 3, plates 77 and 79 are pictured in the operative position of the apparatus rather than in the inoperative position which is under discussion at the present time. Power arm 46 continues to be moved between the two extreme positions A and B without activating either pump assembly 24 or valve assembly 21 until the mechanism is activated by an incoming signal from timing means 32.

Upon signal from the timing means, solenoid 69 moves armature 68 from position F to position E, as viewed in FIGURE 4, whereupon power arm 46 is activated to move from position D to position C by cable 62 which is responsive to motion of armature 68. If power arm 46 is in position A at the time the solenoid is moved, spring 63 is tensioned in an amount greater than ordinary until lower bearing 59 moves past deflector plate 82 and upper bearing 54 moves past deflector plate 91. If these two deflector plates were not provided, it will be seen that the power arm would be caught behind plate 88 and element 79 and the apparatus would thereby be rendered inoperative. At such time as the two deflector plates are cleared, the excess tension in spring 63 is relieved and the power arm moves into position C shown in FIGURE 4. On its initial movement to position A, after activation by solenoid 69, lower bearing 59 encounters element 79 to move that element together with web 78, plate 76 and push rod 74 into a rearward position with respect to valve housing 73. This has the effect of positioning the valve to allow flow of fluid from outlet branch 18 through the valve and into return branch 19. Subsequent oscillation of the power arm results in no further positioning of any portion of valve assembly 21 until such time as the power arm assumes position D. Simultaneously with the positioning of valve assembly 21 in the manner set forth immediately above, the initial displacement stroke of pump 83 is obtained by the action of upper bearing 54 on force plate 88 which moves the force plate toward the pump. When the power arm has reached its extreme position A, it then returns to position B during which time it encounters power transmitting plate 101 to move push rod 84 outwardly away from pump 83 in an inlet stroke of the pump. Continued oscillation of power arm 46 from position A to position B and back results in continued actuation of pump 83 to move fluid from reservoir 26 into return branch 19 and ultimately back into the oil well.

Upon signal from timing means 32, solenoid 69 is once again deactivated whereupon tension spring 61 pivots power arm 46 into position D, shown in FIGURE 4. Assuming that the power arm is in a position to pivot freely as the power arm moves to position D, armature 68 is pulled outwardly through the action of cable 62 and spring 63 into position F, shown in FIGURE 4. In the event that solenoid 69 is deactivated when the power arm is in position B then lower bearing 59 impinges on deflector plate 81 which prevents the power arm from being caught behind vertical plate 76. As the power arm then moves from position B to position A, bearing 59 clears deflector plate 81 allowing the power arm to assume position D as aforesaid. On the next oscillation of the power arm, lower bearing 59 engages plate 76 to move push rod 74 inwardly toward valve housing 73 as the power arm moves from A to B thereby interrupting the flow of fluid into return branch 19 and establishing flow between outlet branch 18 and storage branch 23. Thereafter the mechanism is activated at preselected intervals depending upon the nature and severity of the problem for which the chemical treatment achieved by this invention is prescribed.

In the event that it is desired to change the amount of fluid transmitted to return branch 19 on each stroke of the pump, this may be accomplished by rotating the threaded member 98 to move power transmitting plate 101 closer to force plate 88. If, on the other hand, less fluid is desired in treatment line 22, the threaded member 98 is rotated in the opposite direction to move plate 101 away from plate 88 whereby the distance between the two plates affords a period of lost motion for power arm 46. During this period of lost motion, of course, pump 83 will not operate and the total volume passed through the pump in a single stroke of push rod 84 is thereby lessened.

Alternate embodiment

Figure 5:
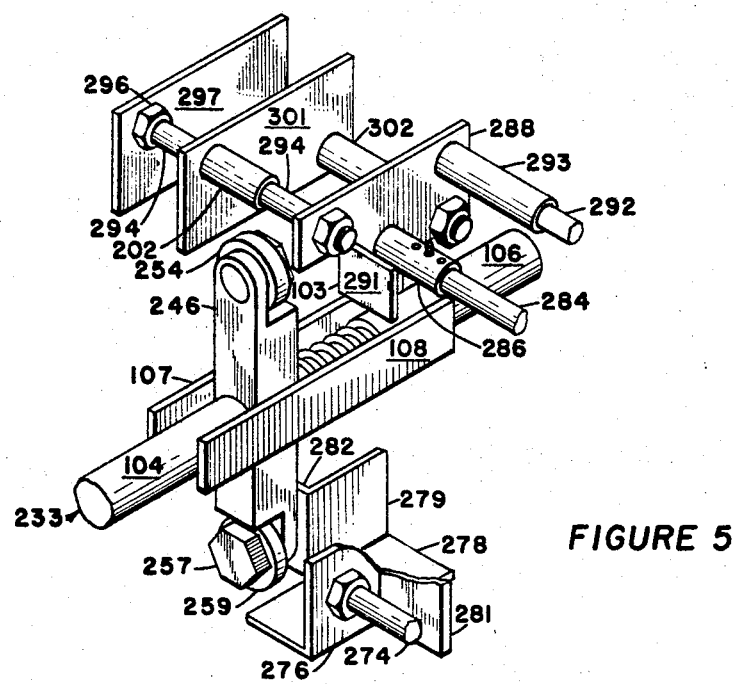
FIGURE 5 is an isometric view of a portion of an alternative form of the present invention showing a non-pivoting power arm.

In the structure disclosed heretofore, power arm 46 is shown as being pivoted on power shaft 33. It is, however, possible to achieve basically the same result with somewhat different apparatus, one form of which is disclosed in FIGURES 5 and 6. In these figures, structural elements which have substantially identical counterparts in the earlier embodiment are identified by the same numbers used for their counterparts except that the value of each such number has been increased by two hundred. For example, adjustment member 97 is indicated in FIGURE 5 to be adjustment member 297 while sleeves 102 are indicated in FIGURE 5 to be sleeves 302. In considering the embodiment of the invention shown in FIGURE 5, it will be noted that force plate 288 is substantially identical to force plate 88 except that the lower lefthand corner of the plate has been cut away by means of a right-angle cut 103 rather than the angle cut 89. For this reason, deflector plate 291 is mounted on force plate 288 in a position normal to the longitudinal axis thereof rather than at an angle as in the earlier embodiment.

Figure 6:
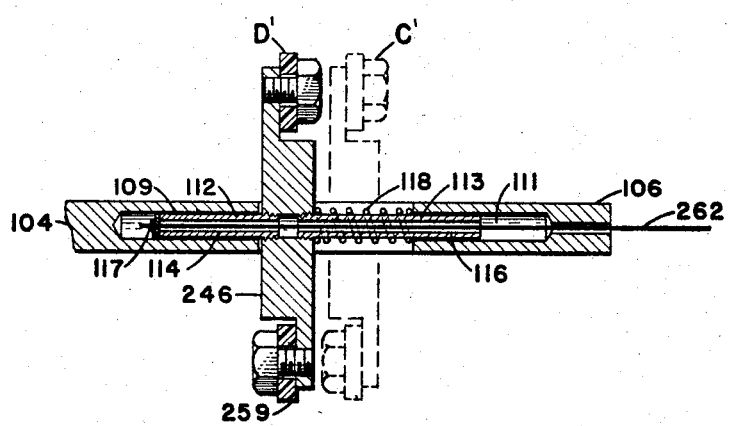
FIGURE 6 is a cross sectional view taken along line 6—6 of FIGURE 5 showing the structural relationships between the various portions of the apparatus shown in FIGURE 5.

The primary structural differences set forth in FIGURE 5 reside in the nature of power arm 246. Unlike power arm 46, power arm 246 does not pivot on power shaft 233 but rather moves along the axis of the power shaft. This shaft is formed from two distinct segments 104 and 106, relative motion between which is prevented by a pair of parellel guide plates 107 and 108 which are rigidly secured at their ends to the segments. This may be accomplished by weld, by bolt or by any other means commonly available to the shop mechanic. The spacing between guide plates 107 and 108 is of such width as to allow free horizontal motion of power arm 246 back and forth between positions C' and D' as shown in FIGURE 6. It will be appreciated that position C' is the active position of the power arm and corresponds to position C of the earlier embodiment.

Turning now to FIGURE 6, the details which make possible the relative motion between power arm 246 and the elements of power shaft 233 are made clear. It will be seen, for instance, that a recess 109 is formed in element 104 in axial alignment with a corresponding recess 111 formed in element 106. Into recesses 109 and 111 are slidingly projected support pins 112 and 113, respectively, which are carried by and project along a common axis from opposite sides of power arm 246. Axial apertures 114 and 116 are formed in support pins 112 and 113, respectively, to receive cable 262. At the outer end of cable 262, within recess 109, is an anchor plug 117 which functions to prevent relative motion between the cable and the power arm assembly. A compression spring 118 is provided around a portion of support pin 113 and abuts power arm 246 and element 106 of power shaft 233 for returning the power arm to position D' when it is at C' and tension on cable 262 is released.

The operation of the alternate embodiment of the power arm is similar to that described above. In its inactive position, the power arm is in position D' with push rod 274 retracted toward valve 73 and push rod 284 extended from pump 83. Under these circumstances oscillation of power arm 246 results in momentary, simultaneous engagement of plate 276 by lower bearing 259 and of power transmitting plate 301 by upper bearing 254. During this engagement no actuation of the mechanical elements takes place. Upon signal from timing means 32, however, solenoid 69 pulls cable 262 to the right as viewed in FIGURE 6 whereupon power arm 246 moves into position C'. On its initial backward movement, after power arm 246 assumes position C', lower bearing 259 engages element 279 whereby push rod 274 is moved backward to divert flow from outlet branch 23 into return branch 19. Simultaneously, upper bearing 254 engages force plate 288, and pump 83 is thereby actuated. Continued oscillation of the power arm results in flow of chemical from the pump to return branch 19 until the power arm is once again returned to position D' on signal from timing means 32.

Deflector plates 282, 281 and 291 serve the same function as do their counterpart deflector plates, 82, 81 and 91, respectively; and, therefore, their specific function will not be repeated at this juncture.

The specific arrangement of flow lines with the three-way valve which has been disclosed heretofore has primary utility under conditions where the annular pressure is at least as high as the flow line pressure. While such structure can be utilized under circumstances wherein the flow line pressure is greater than the annular pressure, it may nevertheless be desirable to utilize other somewhat more simple types of valving. For instance, rather than the two-position, three-way valve disclosed, a simple on-off valve can be placed in the return branch with a check valve in the storage branch; thus, when the annular space at relatively low pressure is placed into communication with the production line by opening the two-way valve, the check valve in the storage branch automatically closes to shunt production into the annular area. Other forms of the apparatus of this invention will be apparent to those skilled in the art without necessitating the exercise of the inventive faculty. It will be understood that various changes in the details, steps, and arrangement of parts, which have been herein described and illustrated in order to explain the nature of the invention, may be made by those skilled in the art within the principle and scope of the invention.

What is claimed is:

1. An apparatus for combining the flow of two fluids which comprises:
   a first fluid conduit;
   a valve assembly in said first fluid conduit;
   a positive displacement pump assembly communicating with a source of fluid;
   a secondary flow line leading from said pump assembly to a point on said first fluid conduit at a point downstream from said valve assembly;
   power means;
   a power arm carried by and movable relative to a portion of said power means for operating said valve assembly and said pump assembly alternatively; and
   control means for moving said power arm into a position to engage said valve assembly and said pump assembly.

2. The apparatus defined in claim 1 wherein said power means includes a rocking arm and wherein said first fluid conduit communicates with the interior of a well in the earth.

3. The apparatus defined in claim 2 wherein said pump assembly comprises a pair of power arm engaging members, said members being located on opposite sides of said power arm.

4. The apparatus defined in claim 2 wherein said valve assembly comprises a pair of offset power arm engaging members, said members being located on opposite sides of said power arm.

5. The apparatus defined in claim 4 wherein said pump assembly comprises a pair of power arm engaging members, said members being located on opposite sides of said power arm.

6. The apparatus defined in claim 2 wherein said power means further comprises a rod on which is movably mounted said power arm and which is moved by said rocking arm.

7. The apparatus defined in claim 6 wherein said control means comprises a timing circuit, a solenoid responsive to said timing circuit, and a cable operatively connected to said solenoid, said cable passing through an aperture formed in said rod and anchored on said power arm.

8. The apparatus defined in claim 7 wherein said pump assembly comprises a pair of power arm engaging members, said members being located on opposite sides of said power arm.

9. The apparatus defined in claim 8 wherein said valve assembly comprises a pair of offset power arm engaging members, said members being located on opposite sides of said power arm.

10. The apparatus defined in claim 1 wherein said first fluid conduit includes an outlet branch leading from an oil well, a storage branch and a shunt branch communicating with the interior of said oil well, and wherein said valve assembly is positioned to place said outlet branch alternatively into communication with said storage branch and said shunt branch.

References Cited
UNITED STATES PATENTS

| | | | |
|---|---|---|---|
| 2,773,551 | 12/1950 | Warden | 166—75 |
| 3,053,320 | 9/1962 | Steincamp | 166—75 X |
| 3,092,029 | 6/1963 | Hanson | 103—23 X |
| 3,171,485 | 3/1965 | White | 166—64 |
| 3,211,225 | 10/1965 | Thiessen | 166—75 |
| 3,223,167 | 12/1965 | Hampton | 166—75 |
| 3,235,008 | 2/1966 | LeGate | 166—75 |

ALAN COHAN, *Primary Examiner.*